(No Model.) 2 Sheets—Sheet 1.
C. A. KING.
GRUBBING MACHINE.
No. 473,191. Patented Apr. 19, 1892.
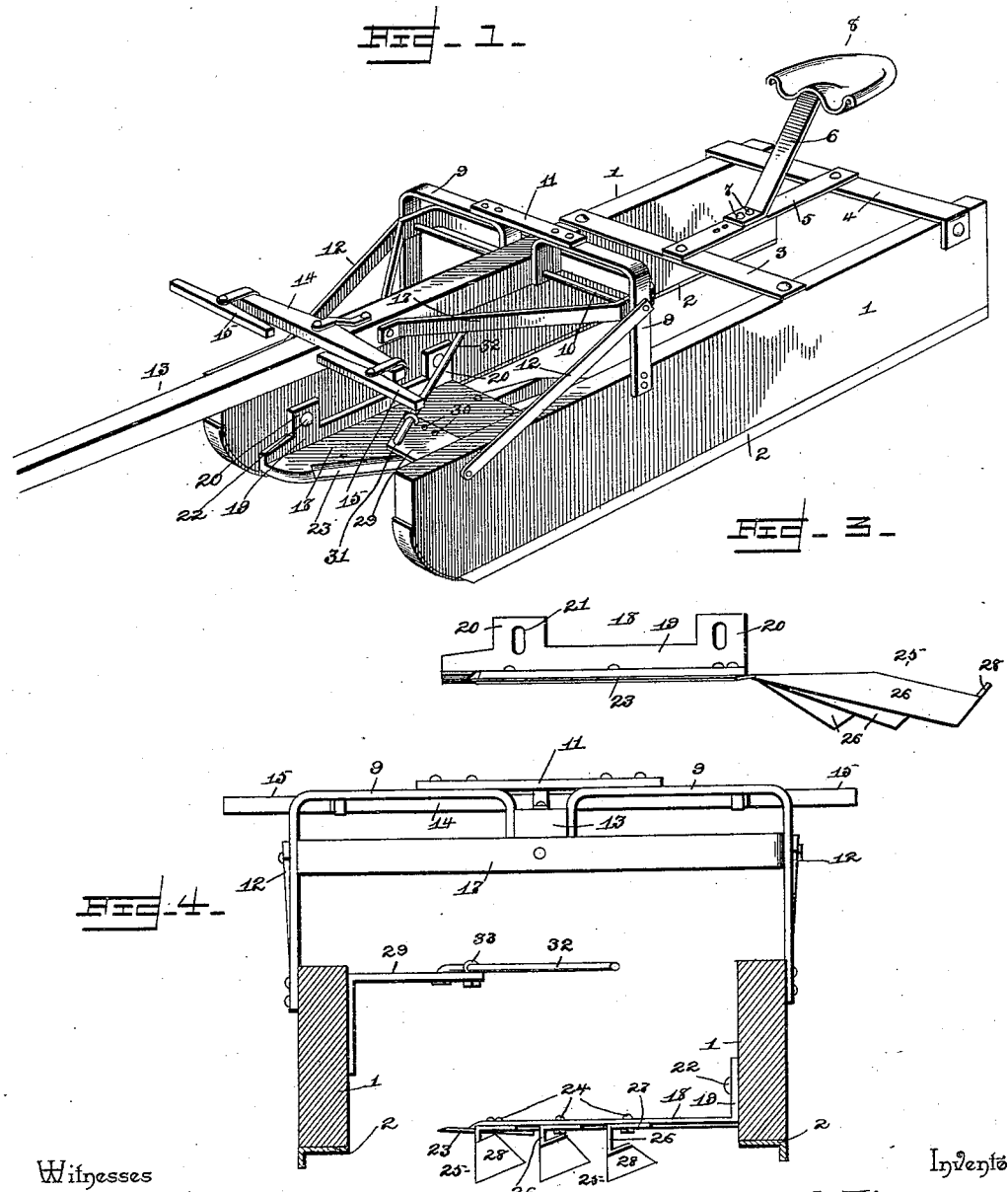
Witnesses
E. S. Duvall Jr
W. S. Duvall
Inventor
Charles A. King.
By his Attorneys,
C. A. Snow & Co.

(No Model.) 2 Sheets—Sheet 2.
C. A. KING.
GRUBBING MACHINE.
No. 473,191. Patented Apr. 19, 1892.
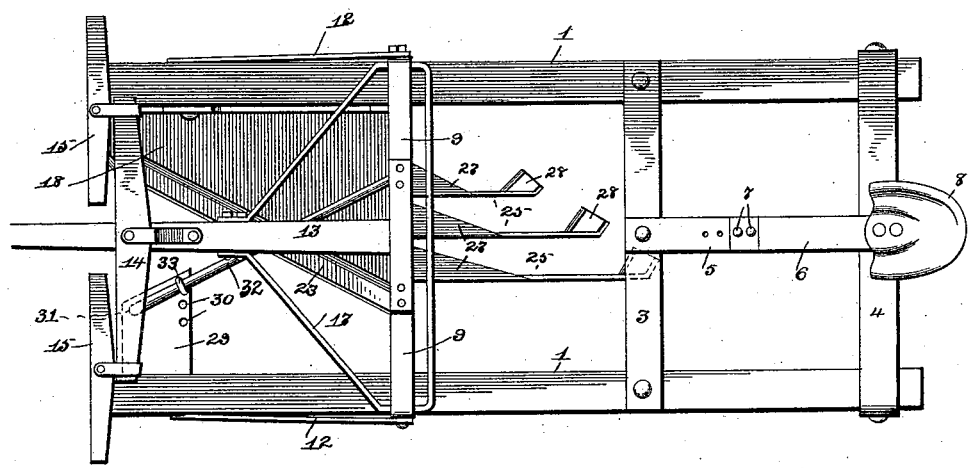
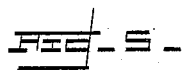
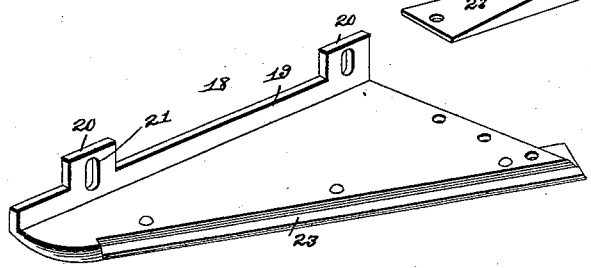
Witnesses: Inventor
E. S. Duvall Jr. Charles A. King.
W. S. Duvall. By his Attorneys,
C. A. Snow & Co.

UNITED STATES PATENT OFFICE.

CHARLES ALBERT KING, OF JACKSONVILLE, NEW JERSEY.

GRUBBING-MACHINE.

SPECIFICATION forming part of Letters Patent No. 473,191, dated April 19, 1892.

Application filed November 14, 1891. Serial No. 411,888. (No model.)

*To all whom it may concern:*

Be it known that I, CHARLES ALBERT KING, a citizen of the United States, residing at Jacksonville, in the county of Burlington and State of New Jersey, have invented a new and useful Grubbing-Machine, of which the following is a specification.

This invention relates to grubbing-machines, the objects in view being to provide a machine of cheap and simple construction adapted to be drawn over fields and to remove the stubs or roots therefrom.

Other objects and advantages of the invention will appear in the following description, and the novel features thereof will be particularly pointed out in the claims.

Referring to the drawings, Figure 1 is a perspective of a machine constructed in accordance with my invention. Fig. 2 is a plan. Fig. 3 is a side elevation of the cutter. Fig. 4 is a transverse section of Fig. 2. Fig. 5 is a detail in perspective of the cutting mechanism. Fig. 6 is a detail of one of the grubbing-hooks.

Like numerals of reference indicate like parts in all the figures of the drawings.

In practicing my invention I construct a sled comprising the opposite side bars or runners 1, secured to the lower edges of which are metal shoes 2, said shoes being L-shaped in cross-section, so as to take a slight distance into the ground, whereby the apparatus is prevented from being deflected from its proper course by the opposition with which it meets during its operation. The opposite bars 1 are connected near their rear ends by the cross-bars 3 and 4, which cross-bars are connected by a perforated seat-bar 5, from which rises an inclined spring-standard 6, adjustably connected with the perforations of the bar 5 by means of bolts 7. The seat-bar supports at its upper end the seat 8 for the driver.

9 designates the pair of opposite U-shaped standards, the outer terminal of each of which is connected to a side bar 1, and the inner terminals of which are connected to the outer terminals by a transverse bar or rod 10. The inner ends of the U-shaped standards 9 are connected by a connecting-bar 11, and the standards are braced by a pair of inclined braces 12, bolted at their front ends to the bars 1 and at their upper ends connected to the rod 10. Between the inner ends of the U-shaped standards and loosely mounted upon the rod 10 is the draft-pole 13, carrying the usual doubletree 14 and singletrees 15. A triangular-shaped hound or bail 17 is mounted loosely on the rod 10, adjacent to the outer terminals of the U-shaped standards, and the forward terminals of the hounds are bolted to the draft-beam between the doubletree and the point of connection with the transverse draft-rod 10.

18 designates a triangular bed-plate, the inner edge of which is provided with an upturned flange 19, from whose ends rise attaching-lugs 20, having vertically-disposed elongated slots 21, through which bolts 22 are passed for the purpose of adjustably attaching the bed-plate to the inner side and near the front end of, in this instance, the right-hand bar 1. The inclined edge of the bed-plate is recessed a short distance from its front end, and the under surface of the recess is beveled and has secured thereto by bolts an inclined cutting-blade 23, which by reason of the beveling of the bed-plate is slightly upwardly disposed, and being inclined longitudinally faciltates the cutting operation hereinafter described. To the rear edge of the bed-plate, which latter is recessed upon its under side, there is secured by a series of bolts 24 a series of graduated grubbing-hoes 25. Each of the hoes 25 consists of a steel shank 26, bent at its front end to form the attaching-plate 27, and at its rear end laterally bent to form an inclined hoe 28. The bend to form the hoe 28 is at an obtuse angle to the lower edge of the shank, so that the laterally-bent portion 28 is inclined. The bottom edge of the shank and also the hoe are beveled, as shown. The hoes are graduated in length, the longest hoe being nearest the knife, and the lateral extension of each hoe extends in rear of the preceding hoe, so that all ground is thoroughly covered or under operation of the hoes.

In operation the sled is drawn along over the rows of corn-stubs or other plants, and the same are severed by the inclined knife close to their roots, the severed portions falling back over the bed-plate. The hoe-shanks are inclined, as shown, from the rear of the bed-plate and gradually take into the ground and serve to split the roots embedded in the ground. Subsequent to the cutting of the roots the hoes which follow after the shanks catch the roots and tear them from the ground, and by reason of the inclination given the hoes the dirt rides up said hoes and over the same, whereby the movement of the machine is not impeded.

From the foregoing description, in connection with the accompanying drawings, it will be seen that I have provided a machine embodying both simplicity and economy, which machine is extremely efficient and successful in cutting off the tops or stubs and splitting and tearing out the roots of cornstalks and other plants.

Various means may be provided for directing the stubs to the action of the knife, and in this instance I employ an L-shaped bracket 29, which I bolt to the inner side of that bar 1 which does not support the bed-plate and cutters. The rear edge of this bracket is provided with a series of adjusting-holes 30 and the front edge with a single opening 31, in which is swiveled a deflecting-rod 32, adapted to be swung over the series of adjusting-holes and to be adjusted at any point along the same by means of a clamping-bolt 33, which embraces the rod and takes into the holes. By thus adjusting the rod the stubs are directed to any point along the knife.

The rear ends of cutters 26 are shown turned to the left, or away from the knife. It will be evident that they may be turned in an opposite direction or toward the knife, and in such case the positions of the graduated cutters would be reversed, the shortest cutter being nearest the knife.

Having described my invention, what I claim is—

1. In a machine of the class described, the combination, with the opposite side bars, of the inverted-U-shaped standards located opposite each other and having their outer terminals bolted to the side bars, a connecting-bar for the standards, a transverse draft-rod connecting the four terminals of the standards, a draft-tongue pivoted on the rod between the inner terminals, inclined braces connected at their upper ends to the outer ends of the draft-rod, and the V-shaped bail mounted on the draft-rod and having its front terminal bolted to the opposite sides of the draft-tongue, substantially as specified.

2. In a machine of the class described, the combination, with the opposite runners, of the inclined cutter secured to one of the runners, the L-shaped bracket secured to the opposite runner and provided with perforations along its rear edge and a single perforation at its front edge, a deflecting-rod swiveled in the single perforation, and a clamping-bolt embracing the rod and connected to one of the rear adjusting-perforations, substantially as specified.

3. In a machine of the class described, the combination, with the opposite runners, of the triangular bed-plate having its inner edge provided with an upturned flange whose ends terminate in upwardly-disposed lugs having elongated slots, bolts passed through the slots into the runners, and a knife located at the outer edge of the plate, substantially as specified.

4. In a machine of the class described, the combination, with the opposite runner and the diagonal bed-plate carrying a cutter, of a series of rearwardly-disposed depending cutting-shanks, substantially as specified.

5. In a machine of the class described, the combination, with the opposite runners, the triangular bed-plate, and the cutter located at the front edge of the same, of the series of cutting-shanks secured to and rearwardly declining from the plate and terminating in laterally-bent ends forming hoes, the hoes and shanks being beveled, substantially as specified.

6. In a machine of the class described, the combination, with the opposite runners, the triangular bed-plate, and the cutter located at the front edge of the same, of the series of rearwardly-disposed cutting-shanks bolted to the bed-plate and graduated in length and declination and having their rear ends laterally bent to form hoes, said ends and shanks being beveled, substantially as specified.

7. In a machine of the class described, the combination, with the diagonal cutter and the frame-work supporting the same, of the series of shanks, each of which consists of the straight beveled portion obtusely bent at its front end and bolted to the bed-plate and obtusely bent at its rear end with relation to its lower edge to form a hoe, substantially as specified.

In testimony that I claim the foregoing as my own I have hereto affixed my signature in the presence of two witnesses.

CHARLES ALBERT KING.

Witnesses:
S. L. TOMLINSON,
JACOB MERRILL.